United States Patent
Sampson

(10) Patent No.: US 9,062,800 B2
(45) Date of Patent: Jun. 23, 2015

(54) CLAMP FOR AN ELONGATED MEMBER

(71) Applicant: Franklin Fastener Company, Redford, MI (US)

(72) Inventor: James M. Sampson, Southfield, MI (US)

(73) Assignee: Franklin Fastener Company, Redford, MI (US)

( * ) Notice: Subject to any disclaimer, the term of this patent is extended or adjusted under 35 U.S.C. 154(b) by 96 days.

(21) Appl. No.: 13/861,868

(22) Filed: Apr. 12, 2013

(65) Prior Publication Data

US 2014/0305617 A1    Oct. 16, 2014

(51) Int. Cl.
A47B 96/06 (2006.01)
A47G 29/00 (2006.01)
A47K 1/00 (2006.01)
E04G 3/00 (2006.01)
E04G 5/06 (2006.01)
F21V 21/00 (2006.01)
F16L 3/137 (2006.01)

(52) U.S. Cl.
CPC .............. F16L 3/137 (2013.01); *Y10T 24/1418* (2015.01)

(58) Field of Classification Search
CPC .............................. F16L 3/137; Y10T 24/1418
USPC ............ 248/74.1, 74.4, 230.4, 230.9, 231.61, 248/230.8
See application file for complete search history.

(56) References Cited

U.S. PATENT DOCUMENTS

| | | | | |
|---|---|---|---|---|
| 4,441,677 A | * | 4/1984 | Byerly | 248/74.3 |
| 5,398,679 A | * | 3/1995 | Freed | 128/207.17 |
| 5,782,090 A | | 7/1998 | Locke | |
| 6,056,045 A | * | 5/2000 | Matsuzaki et al. | 165/134.1 |
| 7,959,114 B2 | | 6/2011 | Spreitzer et al. | |
| 8,091,839 B2 | * | 1/2012 | Whipple et al. | 248/67.7 |
| 2005/0188509 A1 | * | 9/2005 | Sharkey | 24/20 R |
| 2010/0243855 A1 | | 9/2010 | Sampson | |

FOREIGN PATENT DOCUMENTS

DE  1988433   6/1968
KR  20040100466 A  12/2004

* cited by examiner

*Primary Examiner* — Amy Sterling
(74) *Attorney, Agent, or Firm* — Brooks Kushman P.C.

(57) ABSTRACT

A clamp for attaching an elongated member to a supporting surface includes a curved portion, a base strip and a securing strip. The base strip includes flanges that define a catch on opposite lateral sides of the base strip. The securing strip is received between the catches formed on the locking flange that engage upstanding locked flanges formed on the securing strip.

6 Claims, 3 Drawing Sheets

CLAMP FOR AN ELONGATED MEMBER

TECHNICAL FIELD

This disclosure relates to an apparatus for clamping an elongated member such as a hose, tube, or wiring harness to a support.

BACKGROUND

Vehicle manufacturing operations involve assembling a wide variety of components together to build a vehicle. Many components may be assembled with fasteners or welded in place. Elongated components like hoses, tubes, wiring harnesses or other similarly shaped members may require a support intermediate the length of the component that is assembled after the ends of the component are attached to other parts.

Plastic hose clamps are known that have overlapping legs with a clip on both of the facing surfaces of the overlapping legs and a central generally cylindrical portion that is adapted to encompass a hose. One problem with this approach is that the overlapping legs of the clip are held in a spaced relationship to each other when the clip is engaged. The spaced relationship of the legs reduces the robustness of the radiator hose clamp and also increases the space required to accommodate the clamp.

Components parts used in vehicle assembly operations are designed to be easily and quickly assembled in accordance with the design intent and avoid installation in an unspecified manner. The component parts must also be designed to accommodate manufacturing tolerances and they must be designed and oriented to reduce the likelihood of any damage after installation.

The above problems and challenges and others are addressed by this disclosure as summarized below.

SUMMARY

According to one aspect of this disclosure, a clamp is provided for an elongated member (i.e., a hose) that comprises a base strip, a securing strip, and a curved portion connecting the base strip on a first end to the securing strip on a second end. A locking flange extends in a first direction and includes a catch provided on a first lateral edge of the base strip. A locked flange provided on the securing strip extends in the first direction and is disposed laterally inside the locking flange, wherein the locked flange is retained by the catch on the locking tab when the curved portion is assembled around the elongated member and the securing strip is secured to the base strip.

According to another aspect of the disclosure, the clamp may further comprise a second locking flange including a second catch is provided on a second lateral edge of the base strip and a second locked flange is provided on a second lateral edge of the securing strip. The second locked flange engages the second locking flange when the curved portion is assembled around the elongated member and the securing strip is secured to the base strip.

The clamp may further comprise a supporting member defining a retaining ring. A base strip assembly tang is provided on the base strip that extends in the first direction away from the curved portion, and a securing strip assembly tang provided on the securing strip that extends away from the curved portion. The base strip assembly tang and the securing strip assembly tang are inserted in the retaining ring. The base strip assembly tang retains the clamp in the retaining ring that is provided on a fan shroud, the elongated member is a radiator hose and the clamp is a radiator hose clamp.

The clamp may further comprise a flange provided at a distal end of the securing strip that may be gripped to open the clamp by lifting the securing strip off of the base strip.

The clamp may further comprising a first rib formed in the base strip that extends in a first lengthwise direction on the base strip, and a second rib formed in the securing strip that extends in the first direction on the securing strip. The second rib in the securing strip is received on the first rib in the base strip to reinforce and align the base strip and the securing strip.

The curved portion may include first and second lateral sides that are each formed into a radially outwardly extending flange that has an outer edge that is spaced from the hose when the clamp is assembled over the hose.

According to another aspect of this disclosure, a radiator assembly is disclosed for a vehicle. The radiator assembly comprises a radiator hose connected to the radiator, and a fan shroud disposed around a fan. A radiator hose clamp has a hose engaging portion, a base strip extending outwardly from the hose engaging portion, and a securing strip extending outwardly from the hose engaging portion. The base strip has a pair of locking flanges extending in first direction. The securing strip has a pair of locked flanges extending in the first direction and is retained on the base strip between the pair of locking flanges.

The radiator hose is inserted into the hose engaging portion of the radiator hose clamp and the base strip and securing strip are assembled together with the locking flanges capturing the locking flanges.

The locking flanges engage the locked flanges and inhibit the securing strip from shifting relative to the base strip. One of the locking flanges may include a spring clip that engages one of the locked flanges to lock the securing strip to the base strip.

The radiator assembly may further comprise a cushion inserted partially between the base strip and the securing strip, and a fastener. The securing strip and the base strip each define a fastener receiving opening that receive the fastener to secure the radiator hose to the fan shroud.

The radiator assembly may further comprising a receptacle formed on the fan shroud, and wherein the base strip is inserted into the receptacle to facilitate assembly of the radiator hose clamp to the fan shroud and the securing strip is assembled over the receptacle to the base strip.

The radiator assembly may further comprise a catch provided on the locking flanges of the base strip and wherein the locked flanges define a recess. The catches are received in the recesses when the hose engaging portion is assembled around the hose and the securing strip is secured to the base strip.

The above aspects of this disclosure and other aspects will be described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
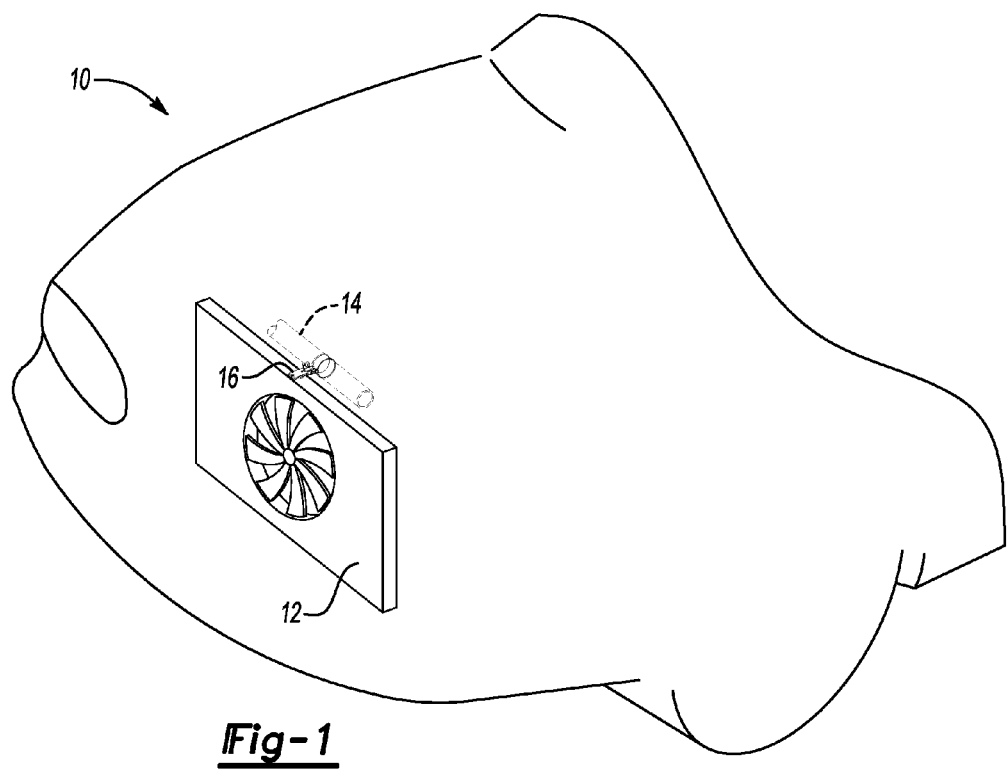
FIG. 1 is a fragmentary perspective view of a vehicle showing a radiator hose connected to a radiator by a clamp.

Referring to FIG. 1, a vehicle 10 is diagrammatically illustrated with a radiator assembly, including a fan shroud 12 in the front portion of the vehicle. An elongated member, or radiator hose 14, is shown secured to the fan shroud 12 by a clamp 16. The clamp 16 may be used to secure the elongated member, such as a hose, tube or wiring harness to a supporting structure.

Figure 2:
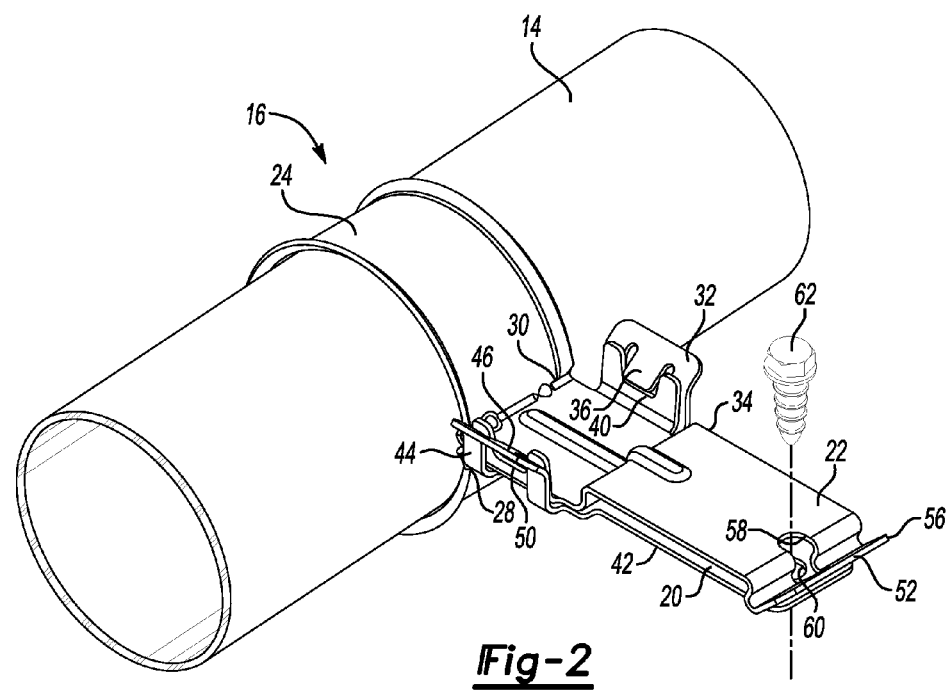
FIG. 2 is a perspective view of a clamp for an elongated member shown attached to an elongated member.
Figure 3:
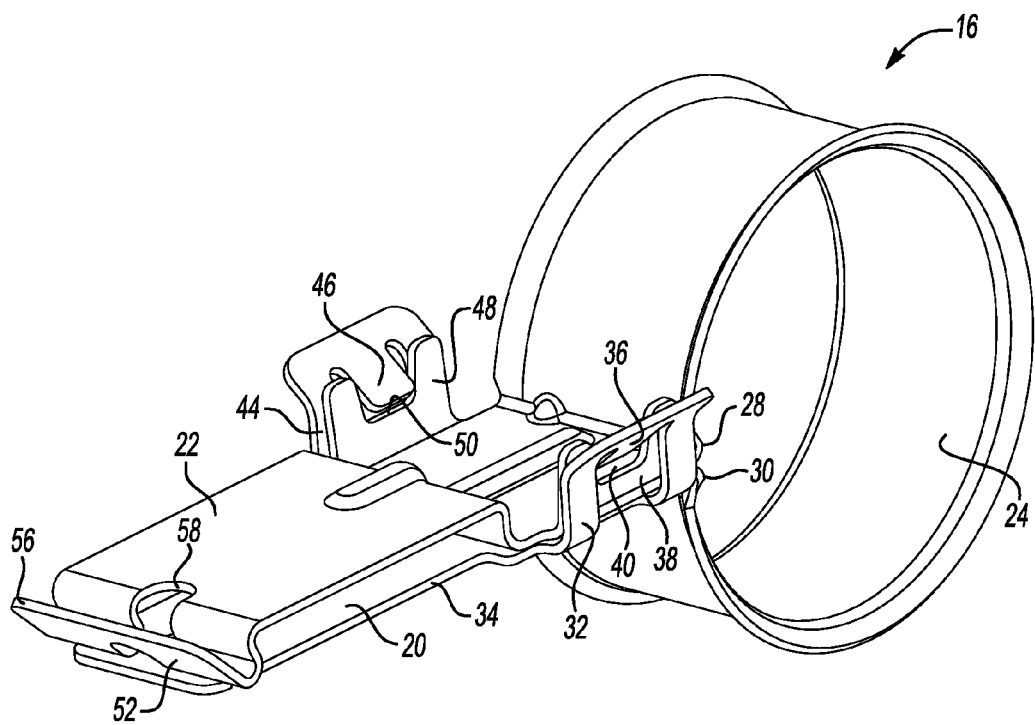
FIG. 3 is a perspective view of the clamp for an elongated member shown in FIG. 2.

Referring to FIGS. 2 and 3, the radiator hose 14 is shown with the clamp generally indicated by reference numeral 16 secured to the radiator hose 14. The clamp 16 includes a base strip 20, a securing strip 22 and a curved portion 24. The base strip 20 is connected to a first end 28 of the curved portion 24. The securing strip 22 is secured to a second end 30 of the curved portion 24.

A locking tab 32 is provided on a first lateral edge 34 of the base strip 20. A catch 36 is formed on the locking tab 32. The catch 36 may also be referred to as a spring clip.

An upstanding flange 38 is provided on the securing strip 22. The upstanding flange 38 may define a recess 40 that receives the catch 36 when the securing strip 22 is secured to the base strip 20.

A second lateral edge 42 of the base strip 20 includes a second locking tab 44. A catch 46 is formed on the second locking tab 44 like the catch 36 on the locking tab 32. The catch 36 and catch 46 are mirror images of each other. A second upstanding flange 48 is provided on the securing strip 22. The second upstanding flange 48 defines a second recess 50. A grasping flange 52 is provided on a distal end 56 of the securing strip 22. The grasping flange 52 may be grasped by a person's fingers or a tool to separate the securing strip 22 from the base strip 20 after they are assembled together. A fastener receiving opening 58 is defined in securing strip 22 and a fastener receiving slot 60 is defined in the base strip 20. A fastener 62 is inserted through the fastener receiving opening 58 and fastener receiving slot 60. The fastener 62 secures the clamp 16 to the fan shroud 12.

Figure 4:
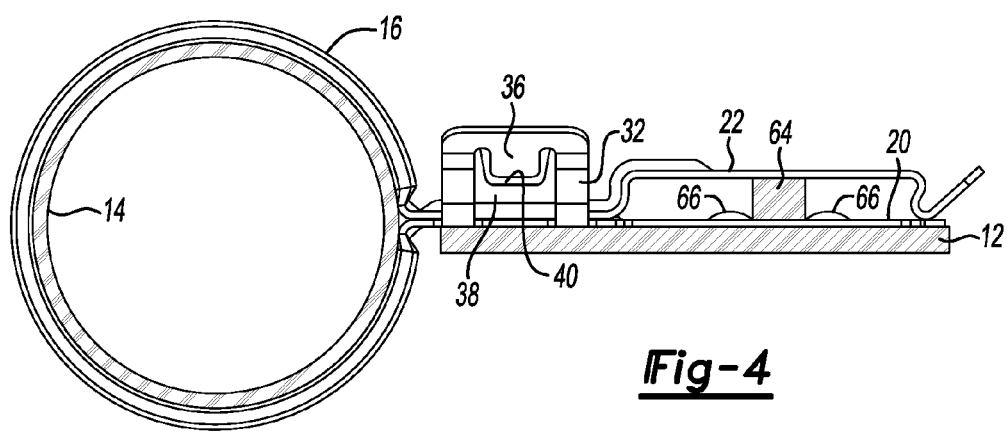
FIG. 4 is a longitudinal cross-sectional view showing a radiator hose connected by a clamp for an elongated member to a radiator.

Referring to FIG. 4, the clamp 16 is shown in cross-section attached to the radiator hose 14 and the fan shroud 12. The fan shroud 12 includes a retaining ring 64 that is used to anchor the clamp 16 to the fan shroud 12. The clamp 16 is assembled over the radiator hose 14. The base strip 20 is inserted into the retainer ring 64 until the retainer ring 64 is received between two dimples 66 that are formed on the base strip 20. The securing strip 22 is then closed over the retainer ring 64. The securing strip 22 is then locked by the catches 36, 46 and the flanges 32, 38, 44 and 52, as previously described with reference to FIGS. 2 and 3.

Figure 5:
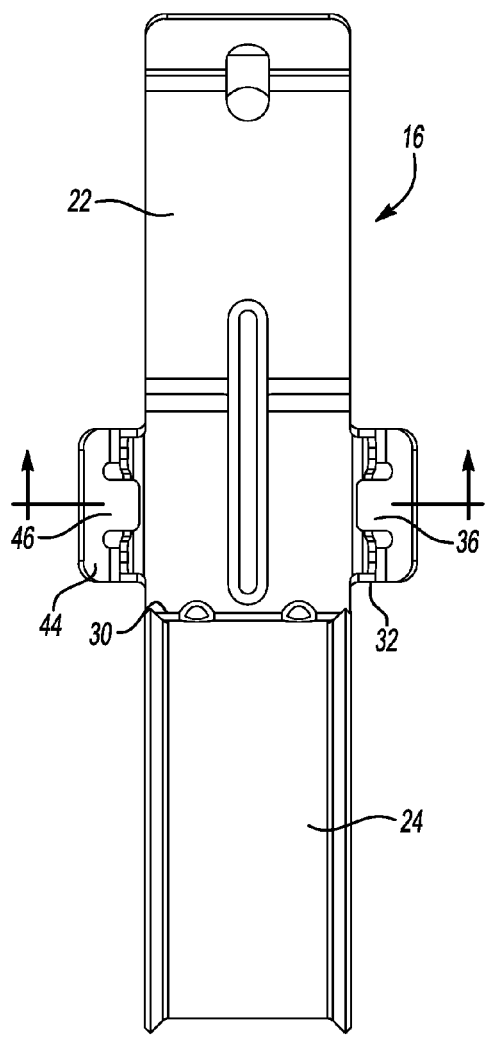
FIG. 5 is a top plan view of the clamp for an elongated member.

Referring to FIG. 5, the clamp is shown in a top plan view with the curved portion 24 at the lower end of the view. The curved portion 24 is joined to the securing strip 22 at a second end 30 of the curved portion 24. An upper rib 70 is provided on the securing strip 22 between the catch 36 formed on the locking flange 32 and between the catch 46 formed on the second locking flange 44. The upper rib 70 functions to align the securing strip 22 with the base strip 20.

Figure 6:
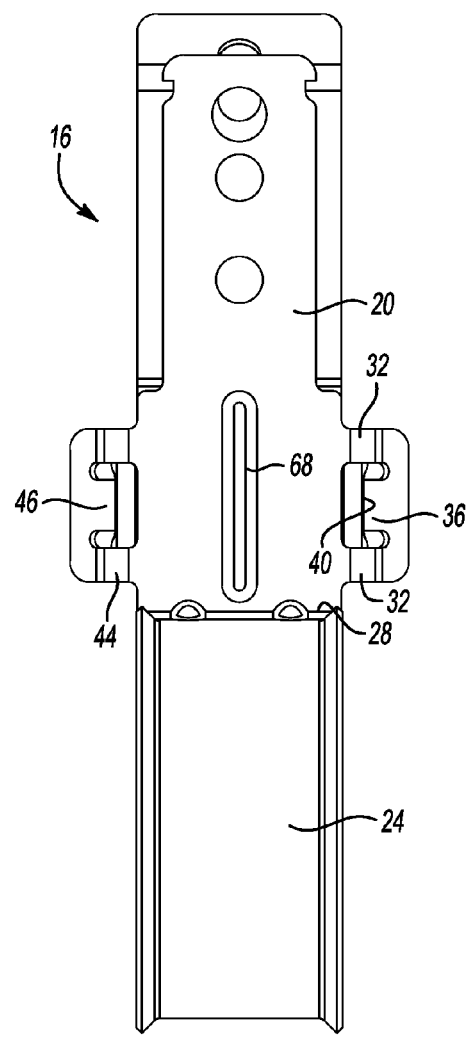
FIG. 6 is a bottom plan view of the clamp for an elongated member.

Referring to FIG. 6, the clamp 16 is shown in a bottom plan view with the curved portion 24 at the lower end of the view. A lower rib 68 is provided on the base strip 20 between the catches 36 and 46 and the first locking flange 32 and second locking flange 44. The lower rib 68 is received by the upper rib 70 to align the securing strip 22 with the base strip 20.

Figure 7:
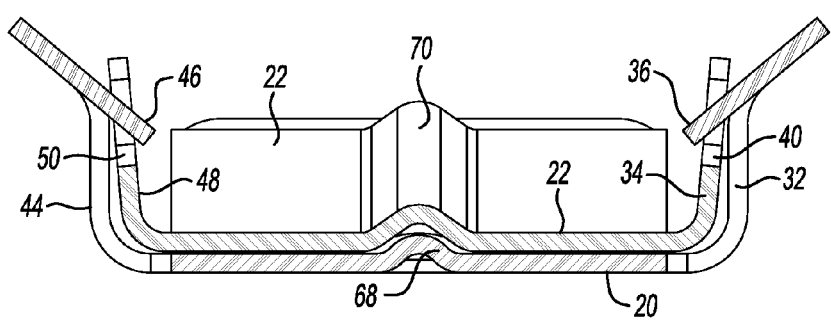
FIG. 7 is a transverse cross-sectional view of the clamp for an elongated member.

Referring to FIG. 7, the securing strip 22 is secured to the base strip 20 is illustrated in greater detail. The catches 36 and 46 are received in the recesses 40 and 50 in the first locking flange 32 and second locking flange 48, respectively. The lower rib 68 is received in the depression formed on the lower side of the upper rib 70.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A clamp for an elongated member comprising:
   a base strip;
   a securing strip;
   a curved portion connecting the base strip on a first end to the securing strip on a second end;
   a locking flange including a catch is provided on a first lateral edge of the base strip and extends in a first direction;
   a locked flange is provided on the securing strip that extends in the first direction and is disposed laterally inside the locking flange, wherein the locked flange is retained by the catch on the locking flange when the curved portion is assembled around the elongated member and the securing strip is secured to the base strip;
   a second locking flange provided on a second lateral edge of the base strip; and
   a second locked flange is provided on a second lateral edge of the securing strip, wherein the second locked flange engages the second locking flange when the curved portion is assembled around the elongated member and the securing strip is secured to the base strip.

2. The clamp of claim 1 in combination with a fan shroud defining a retaining ring, the base strip extending in the first direction and away from the curved portion, and the securing strip extending in the first direction away from the curved portion, and wherein the base strip is inserted into the retaining ring and the securing strip is closed over the retaining ring.

3. The clamp of claim 2 wherein the base strip retains the clamp in the retaining ring provided on the fan shroud, and wherein the elongated member is a radiator hose, and the clamp is a radiator hose clamp.

4. A clamp for an elongated member comprising;
   a base strip;
   a securing strip;
   a curved portion connecting the base strip on a first end to the securing strip on a second end;

a locking flange including a catch is provided on a first lateral edge of the base strip and extends in a first direction;

a locked flange is provided on the securing strip that extends in the first direction and is disposed laterally inside the locking flange, wherein the locked flange is retained by the catch on the locking flange when the curved portion is assembled around the elongated member and the securing strip is secured to the base strip; and a flange disposed at a distal end of the securing strip that may be gripped to open the clamp.

5. The clamp of claim 1 further comprising a first rib formed in the base strip that extends in the first direction on the base strip, a second rib formed in the securing strip that extends in the first direction on the securing strip, wherein the second rib in the securing strip is received on the first rib in the base strip to reinforce and align the base strip and the securing strip.

6. A clamp for a hose comprising:

a base strip;

a securing strip;

a curved portion connecting the base strip on a first end to the securing strip on a second end, wherein the curved portion includes first and second lateral sides that are each formed into a radially outwardly extending flange that has an outer edge that is spaced from the hose when the clamp is assembled over the hose;

a locking flange including a catch is provided on a first lateral edge of the base strip and extends in a first direction; and a locked flange is provided on the securing strip that extends in the first direction and is disposed laterally inside the locking flange, wherein the locked flange is retained by the catch on the locking flange when the curved portion is assembled around the hose and the securing strip is secured to the base strip.

\* \* \* \* \*